(12) United States Patent
Wang et al.

(10) Patent No.: US 12,434,575 B2
(45) Date of Patent: Oct. 7, 2025

(54) BROADBAND MUFFLER FOR FUEL CELL VEHICLE

(71) Applicant: MANN+HUMMEL FILTER (SHANGHAI) CO., LTD., Shanghai (CN)

(72) Inventors: Kaizhuan Wang, Shanghai (CN); Yimin Ni, Shanghai (CN)

(73) Assignee: MANN+HUMMEL FILTER (SHANGHAI) CO., LTD., Shanghai (CN)

( * ) Notice: Subject to any disclaimer, the term of this patent is extended or adjusted under 35 U.S.C. 154(b) by 290 days.

(21) Appl. No.: 18/344,922

(22) Filed: Jun. 30, 2023

(65) Prior Publication Data

US 2023/0339335 A1    Oct. 26, 2023

Related U.S. Application Data

(63) Continuation of application No. PCT/CN2021/140711, filed on Dec. 23, 2021.

(30) Foreign Application Priority Data

Dec. 30, 2020 (CN) .......................... 202011609137.9

(51) Int. Cl.
*B60L 50/72* (2019.01)
*G10K 11/16* (2006.01)

(52) U.S. Cl.
CPC ............ *B60L 50/72* (2019.02); *G10K 11/161* (2013.01); *B60L 2270/142* (2013.01)

(58) Field of Classification Search
CPC . B60L 50/72; B60L 2270/142; G10K 11/161; F01N 2240/32
See application file for complete search history.

(56) References Cited

U.S. PATENT DOCUMENTS 4,361,206 A    11/1982    Tsai
4,896,503 A    1/1990    Furlan
(Continued)

FOREIGN PATENT DOCUMENTS

CN    103670637 A    3/2014
CN    104074585 A    10/2014
(Continued)

OTHER PUBLICATIONS

EPO Search Report in corresponding EPO Appln. No. 21914109.0, YYYY-MM-DD, Munich, Germany.

*Primary Examiner* — Jeremy A Luks

(57) ABSTRACT

A broadband muffler for a fuel cell vehicle includes a first housing, a second housing connected to the first housing to form a sealed cavity, and an inner cannula disposed in the seal cavity and dividing the sealed cavity into chambers, the inner cannula comprising square or rectangular openings through a surface of the inner cannula in a first one of the chambers, the inner cannula comprising round holes through the surface of the inner cannula in a different one of the chambers, the square or rectangular openings and the round holes being for reducing noise. The broadband muffler further includes a water collection tank disposed in the second housing, a venturi tube connected to an exhaust port of the inner cannula, and a drainage tube disposed at a center of the venturi tube and connected to the water collection tank.

11 Claims, 15 Drawing Sheets

(56) References Cited

U.S. PATENT DOCUMENTS

| | | | |
|---|---|---|---|
| 2004/0149515 A1* | 8/2004 | Toyoshima | F01N 1/089 181/258 |
| 2006/0040158 A1* | 2/2006 | Numata | F01N 3/005 429/513 |
| 2006/0113145 A1* | 6/2006 | Toyoshima | H01M 8/0662 181/269 |
| 2008/0185218 A1 | 8/2008 | Kondo et al. | |
| 2009/0045006 A1* | 2/2009 | Kondo | H01M 8/0662 181/252 |
| 2010/0279191 A1* | 11/2010 | Matsuura | H01M 8/04164 429/514 |
| 2013/0175114 A1* | 7/2013 | Heo | F01N 1/089 181/233 |
| 2020/0318523 A1* | 10/2020 | Kim | F01N 1/02 |

FOREIGN PATENT DOCUMENTS

| | | |
|---|---|---|
| CN | 206175028 U | 5/2017 |
| CN | 211422806 U | 9/2020 |
| CN | 215171079 U | 12/2021 |
| JP | 2005171874 A * | 6/2005 |
| JP | 2009289581 A * | 12/2009 |
| WO | 2009099399 A1 | 8/2009 |

\* cited by examiner

BROADBAND MUFFLER FOR FUEL CELL VEHICLE

CROSS-REFERENCE TO RELATED APPLICATIONS

This application is a continuation application of International Application No. PCT/CN2021/140711 filed on Dec. 23, 2021, which claims the benefit of Chinese Application No. 2020116091379 filed on Dec. 30, 2020, the entire disclosures of which are incorporated herein by reference for all purposes.

BACKGROUND

Embodiments relate to a muffler for automobiles, in particular to a wideband muffler for fuel cell vehicles.

At present, the trend of new energy for passenger vehicles and the country's policy advocacy for new energy vehicles have led to the development of major OEMs in the field of new energy vehicles. One of the new energy vehicles, fuel cell vehicles, is currently developing rapidly. A fuel cell mixes and reacts with a combustible gas, hydrogen, by inhaling fresh air to release power to a car. However, in a process of the fuel cell powering the car, both intake and exhaust ends of the fuel cell may generate a bandwidth of broadband noise.

At present, measures taken by OEMs and intake and exhaust system suppliers for the broadband noise are to determine a frequency of the problem through a large number of subjective and objective analyses after measuring noise data, and then specially design and install corresponding devices on intake and exhaust pipelines.

For example, a broadband muffler for a frequency band reduces broadband noise, but has disadvantages of a slow response, a long period, and a high cost. In addition, because liquid water is generated at an exhaust end of a fuel cell, the broadband muffler designed for broadband noise generated by a turbocharger cannot be applied to an exhaust end of a fuel cell vehicle, and the broadband muffler may often fail due to an accumulation of water.

SUMMARY

Purposes of the embodiments are to solve the noise attenuation problem of fuel cell vehicles and to provide a broadband muffler for fuel cell vehicles with an integrated water separation structure and ultra-wideband noise attenuation.

The purposes of the embodiments are achieved through the following technical solutions.

According to embodiments, a broadband muffler for a fuel cell vehicle includes a first housing, a second housing connected to the first housing to form a sealed cavity, and an inner cannula disposed in the seal cavity and dividing the sealed cavity into chambers, the inner cannula comprising square or rectangular openings through a surface of the inner cannula in a first one of the chambers, the inner cannula comprising round holes through the surface of the inner cannula in a different one of the chambers, the square or rectangular openings and the round holes being for reducing noise. The broadband muffler further includes a water collection tank disposed in the second housing, a venturi tube connected to an exhaust port of the inner cannula, and a drainage tube disposed at a center of the venturi tube and connected to the water collection tank.

When in operation, an intake end of the first housing of the broadband muffler is connected to an exhaust pipe of the fuel cell stack, and broadband high-frequency noise generated by the fuel cell stack enters the broadband muffler. Noise energy of a corresponding frequency band is attenuated. At the same time, gaseous/liquid water produced by a chemical reaction of a reactor is also transferred to the broadband muffler through a pipeline, and part of the water enters chambers of the muffler and finally flows to the water collection tank due to gravity. When stored, in a running state, when an air flow in the pipe passes, two ends of an inlet and an outlet of the venturi tube at the exhaust port of the inner cannula form a pressure difference with a middle position. This pressure difference presses the water from the water collection tank to the inner cannula through the drainage tube. It is discharged out of the pipe along a direction of the air flow, that is, the water generated by the stack is discharged along the exhaust pipe while silencing sound.

The water collection tank may be rectangular and may extend along an inner side surface of the second housing.

The second housing may be a stepped cylindrical tube, and the inner cannula may include a pipe body and annular partitions disposed on a circumferential outer surface of the pipe body, the annular partitions being respectively arranged at steps of the stepped cylindrical tube and forming the chambers between the annular partitions.

The inner cannula may include the round holes through the surface of the inner cannula in 2-5 of the chambers.

The square or rectangular openings through the surface of the inner cannula in the first one of the chambers may be disposed adjacent to an intake end of the inner cannula.

The broadband muffler may further include sound-absorbing cotton disposed on and/or over an outside of each of the square or rectangular openings through the surface of the inner cannula in the first one of the chambers, to form a resistive resonant cavity.

The round holes through the surface of the inner cannula in the different one of the chambers may form resistant resonant cavities.

The first housing may include an outer sleeve in a shape of a bell mouth with a small upper end and a large lower end, and connected to an end of the second housing, and a central air inlet pipe opposite to an output end of the inner cannula.

A lower end of the central air inlet pipe may be longer than the outer sleeve, the lower end of the central air inlet pipe may be in a shape of a bell mouth, and an upper end of the inner cannula may be in a shape of a bell mouth, on which the lower end of the central air inlet pipe is disposed.

The first housing further may include a water separation structure for pre-separating water vapor from upstream air, and disposed in the central air inlet pipe. The water separation structure may include blades arranged in rotation.

The broadband muffler integrates drainage and water separation structures, which can reduce noise at an exhaust end of the fuel cell vehicle and achieve a function of drainage at the same time, and meet the needs of the exhaust end of the fuel cell vehicle. The broadband muffler used in the fuel cell vehicle of the embodiments integrates a specific sound-absorbing cotton muffling capability, and can cover noise frequencies from 1000 Hz to 8000 Hz.

The embodiments have the following advantages.

A special drainage structure-venturi tube is integrated in the muffler, which can realize a self-draining function under actual vehicle operation.

The square or rectangular water collection tank opened on a side of the second housing runs through the entire muffler, which can collect the water entering each chamber in a concentrated manner, thereby preventing each chamber of the muffler from failing due to accumulation of water.

The sound-absorbing cotton can be quickly replaced, and a muffler with different sound-absorbing properties can be obtained. Due to actual acoustic performance requirements and cost requirements, different acoustic performance and cost requirements can be achieved by replacing differently the sound-absorbing cotton.

The sound-absorbing cotton itself is waterproof, and will not cause the sound-absorbing cotton to fail due to absorption of liquid water. The sound-absorbing cotton can broaden an acoustic performance of the resistant muffler. After it is waterproofed, it can prevent its failure due to water absorption. Therefore, the integration of the muffler with the sound-absorbing cotton can be used in an exhaust system of the fuel cell vehicle.

The water separation structure integrated in the first housing can pre-separate the water vapor from the upstream.

DETAILED DESCRIPTION

The embodiments will be described in detail below with reference to

DRAWINGS

Case 1

Figure 1:
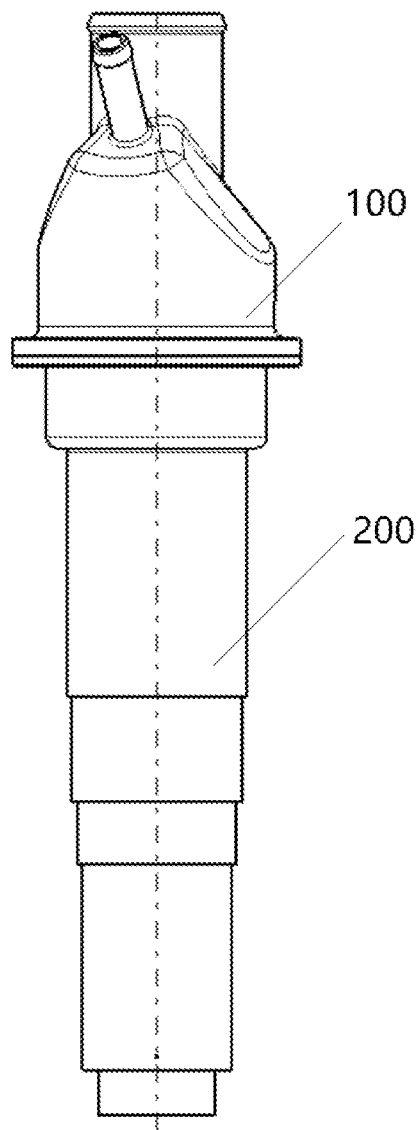
FIG. 1 is a side view of a broadband muffler according to embodiments.
Figure 2:
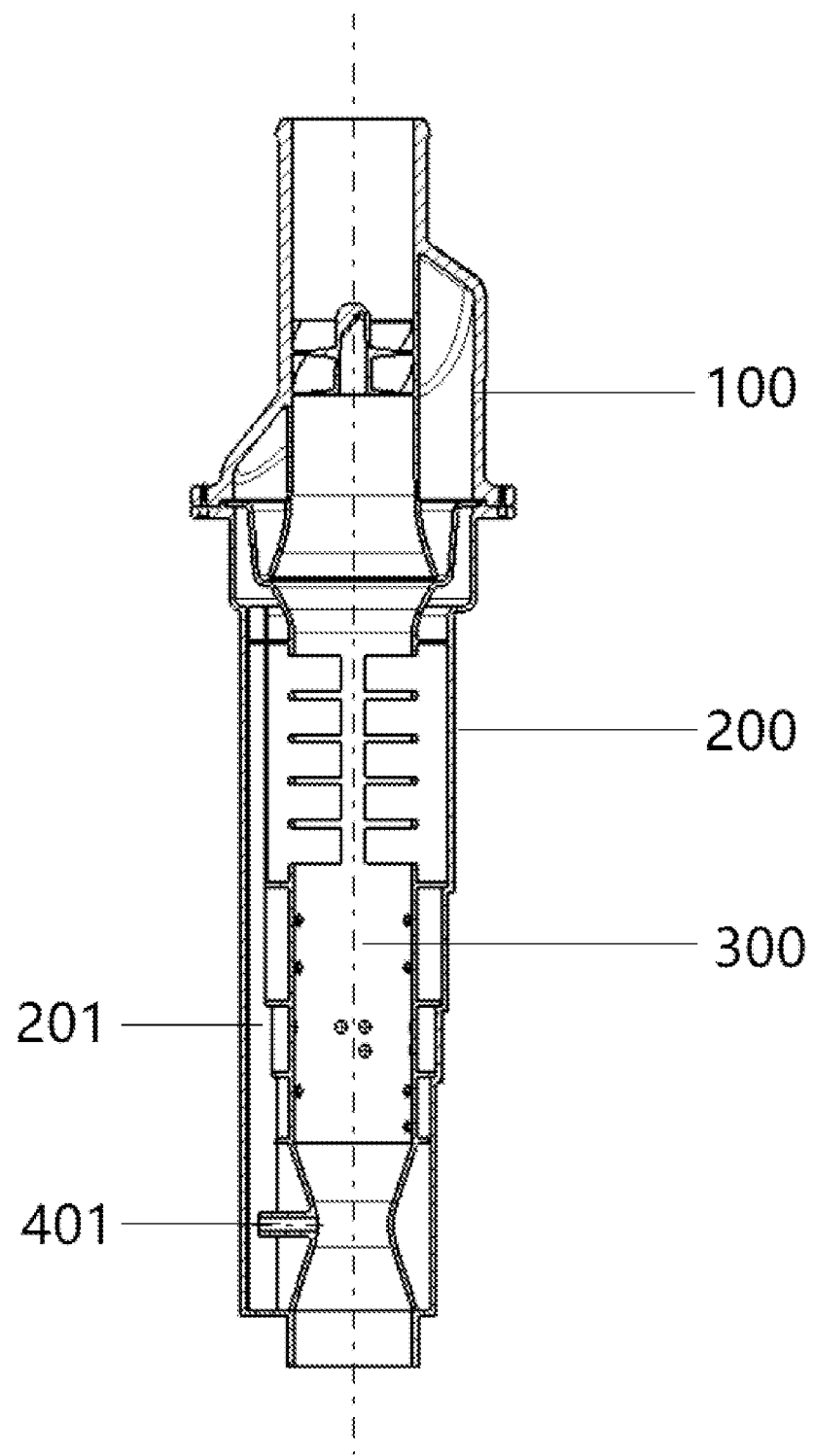
FIG. 2 is a cross-sectional view of the broadband muffler of FIG. 1.

As shown in FIGS. 1 and 2, a broadband muffler for a fuel cell vehicle includes a first housing 100, a second housing 200 and an inner cannula 300. The first housing 100 and the second housing 200 are connected to form a seal. The inner cannula 300 is installed in a sealed cavity formed by the first housing 100 and the second housing 200, and the inner cannula 300 has holes or grooves to form a plurality of silencing structures in the sealed cavity.

Figure 6:
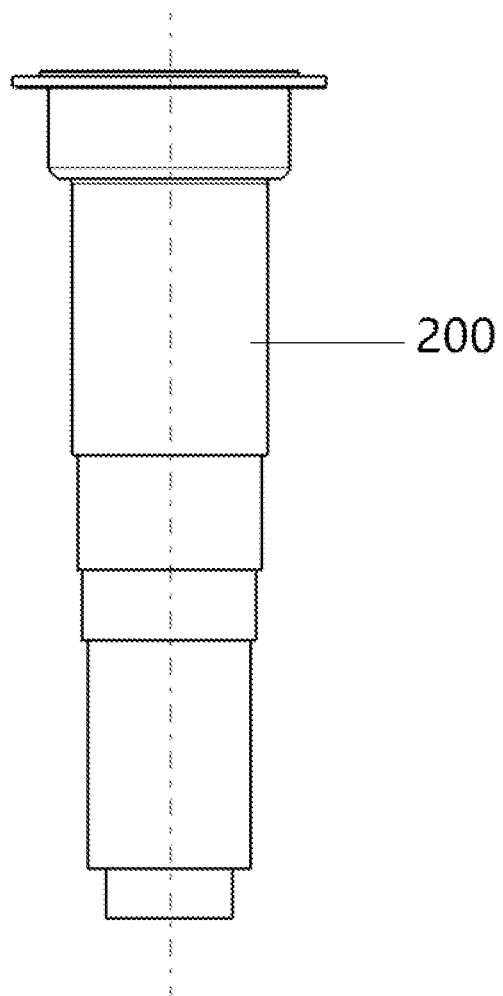
FIGS. 6 and 7 are exploded side views of a second housing of the broadband muffler of FIG. 1.
Figure 7:
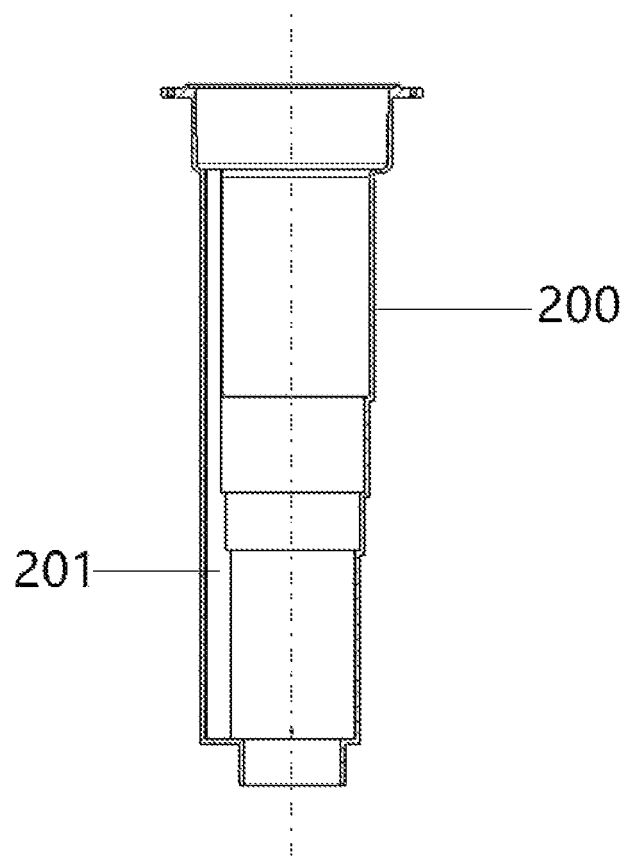

As shown in FIGS. 2, 6 and 7, the second housing 200 is a stepped cylindrical tube. A water collection tank 201 is provided along a side of the second housing 200. The water collection tank 201 is a rectangular water collection tank that penetrates the entire second housing 200. Water entering each chamber of the broadband muffler can be collected collectively, thereby preventing each chamber from failing due to an accumulation of water.

Figure 8:
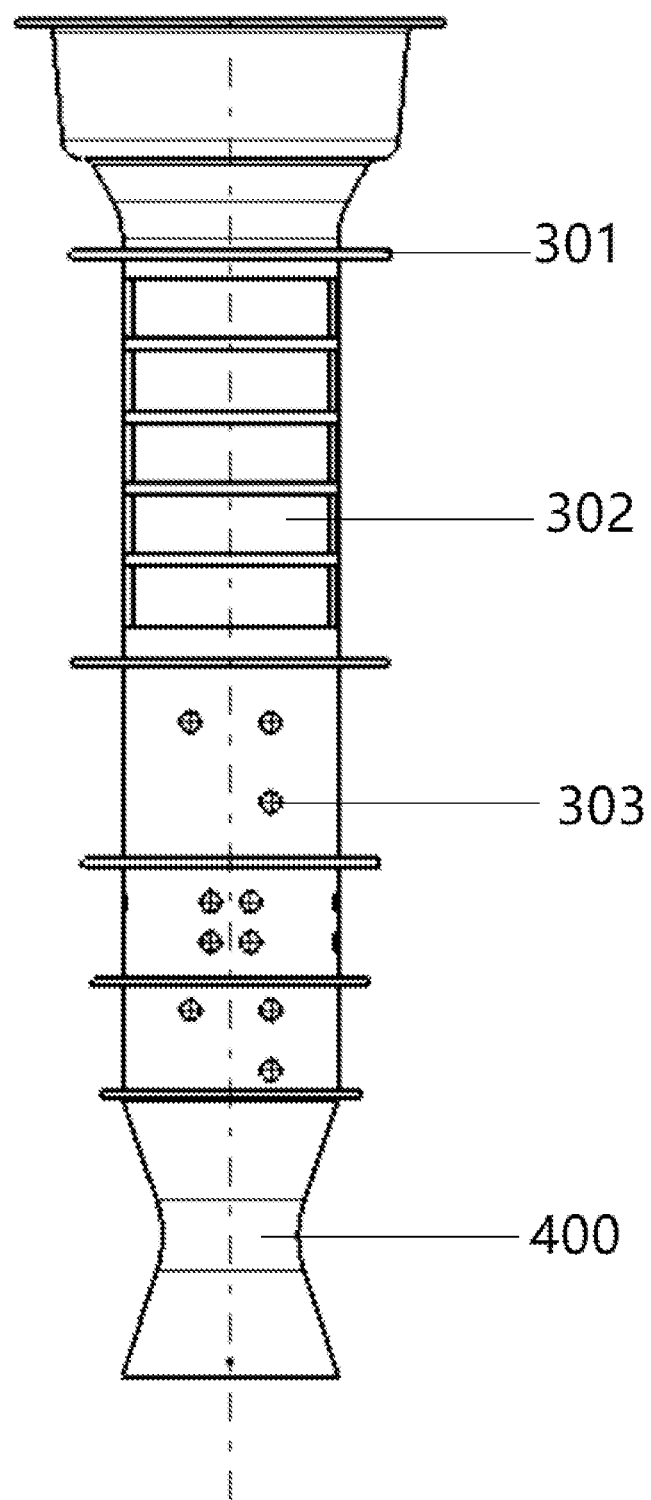
FIGS. 8 and 9 are cross-sectional views of an inner duct of the broadband muffler of FIG. 1.
Figure 9:
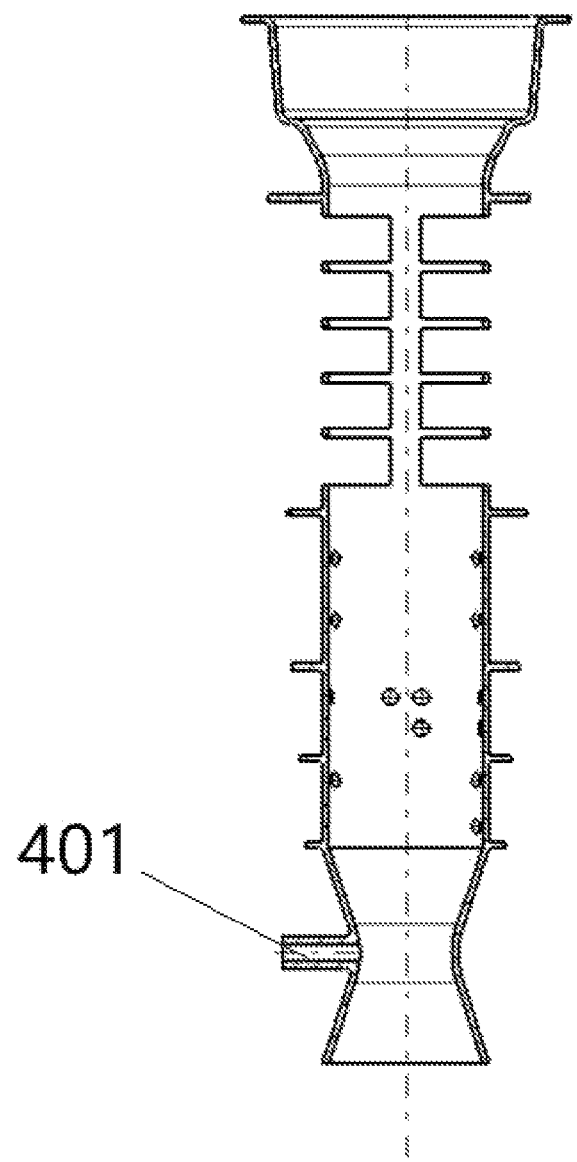

As shown in FIGS. 2, 8 and 9, one end of an exhaust port of the inner cannula 300 is connected to a venturi tube 400. A drainage tube 401 communicating with the water collection tank 201 is provided at a center of the venturi tube 400.

As further shown in FIGS. 2, 8 and 9, the inner cannula 300 includes a central pipe body. A plurality of annular partitions 301 are provided on a circumferential wall of the central pipe body. After the second housing 200, a plurality of anechoic chamber structures are formed between the plurality of annular partitions 301 and the second housing 200. Each of the anechoic chamber structures includes a resistive resonant cavity or a plurality of resistive resonant cavities. At a section of the central pipe body close to an air inlet end, a number of square or rectangular grooves or openings 302 are opened on a circular pipe wall of the central pipe body, and sound-absorbing cotton 500 is arranged on and/or over the outside of each of the grooves or openings 302 to form a resistive resonant cavity. The sound-absorbing cotton 500 can be quickly replaced to obtain a muffler with different sound-absorbing properties.

In detail, due to actual acoustic performance requirements and cost requirements, different acoustic performance and cost requirements can be achieved by replacing the sound-absorbing cotton 500. The sound-absorbing cotton 500 is waterproof and may not fail due to absorption of liquid water. The sound-absorbing cotton 500 can broaden acoustic performance of the resistant broadband muffler, and after it is waterproofed, failure of the muffler due to water absorption can be prevented. Therefore, the muffler including the integrated sound-absorbing cotton 500 can be used in a fuel cell.

A round pipe wall of the central pipe body has holes 303 in remaining positions except for slots including the annular partitions 301, forming multiple resistant resonant cavities. A size and a rate of the holes 303 are specifically designed according to actual needs, using round holes or slots and different wall thicknesses. The sealed cavity formed by the first housing 100 and the second housing 200 is combined into a Helmholtz muffler, which can form multiple mufflers with different axial directions in series.

Figure 3:
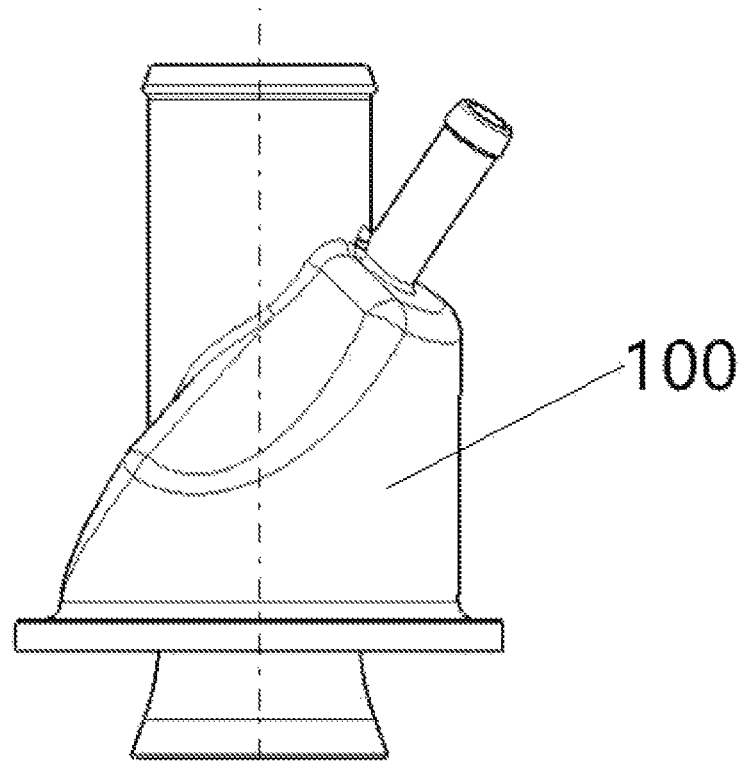
FIG. 3 is an exploded side view of a first housing of the broadband muffler of FIG. 1.
Figure 4:
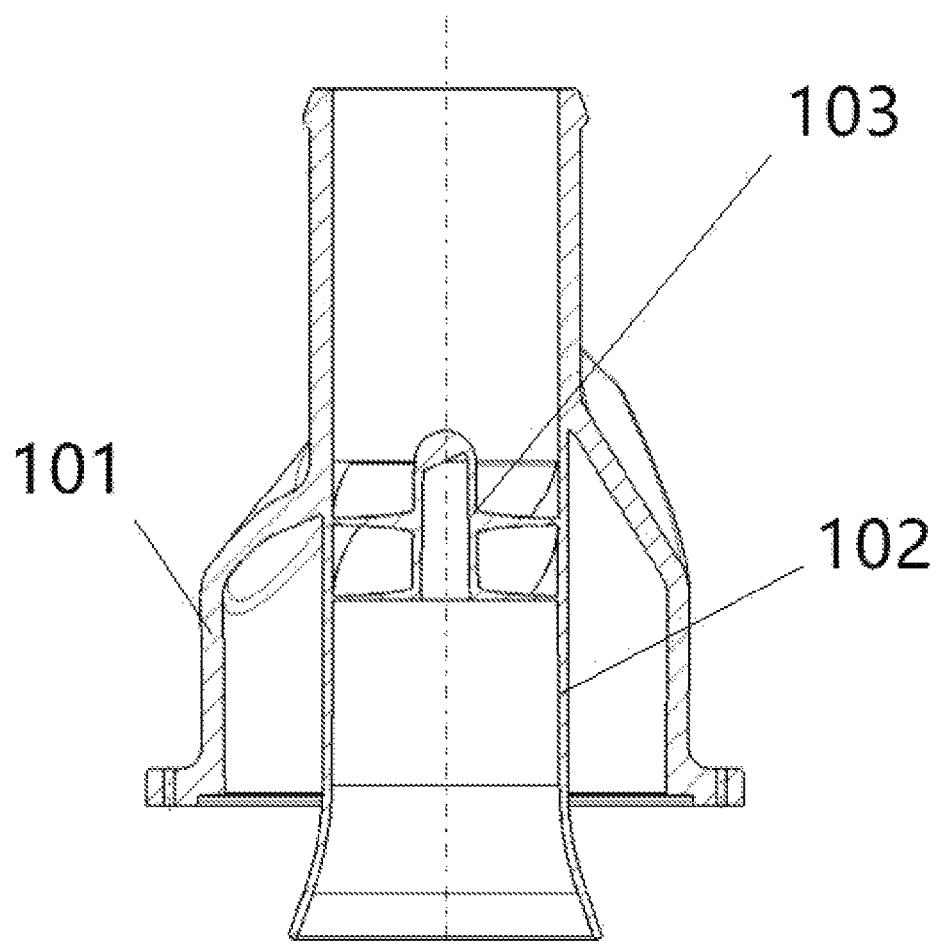
FIG. 4 is a cross-sectional view of the first housing of FIG. 3.
Figure 5:
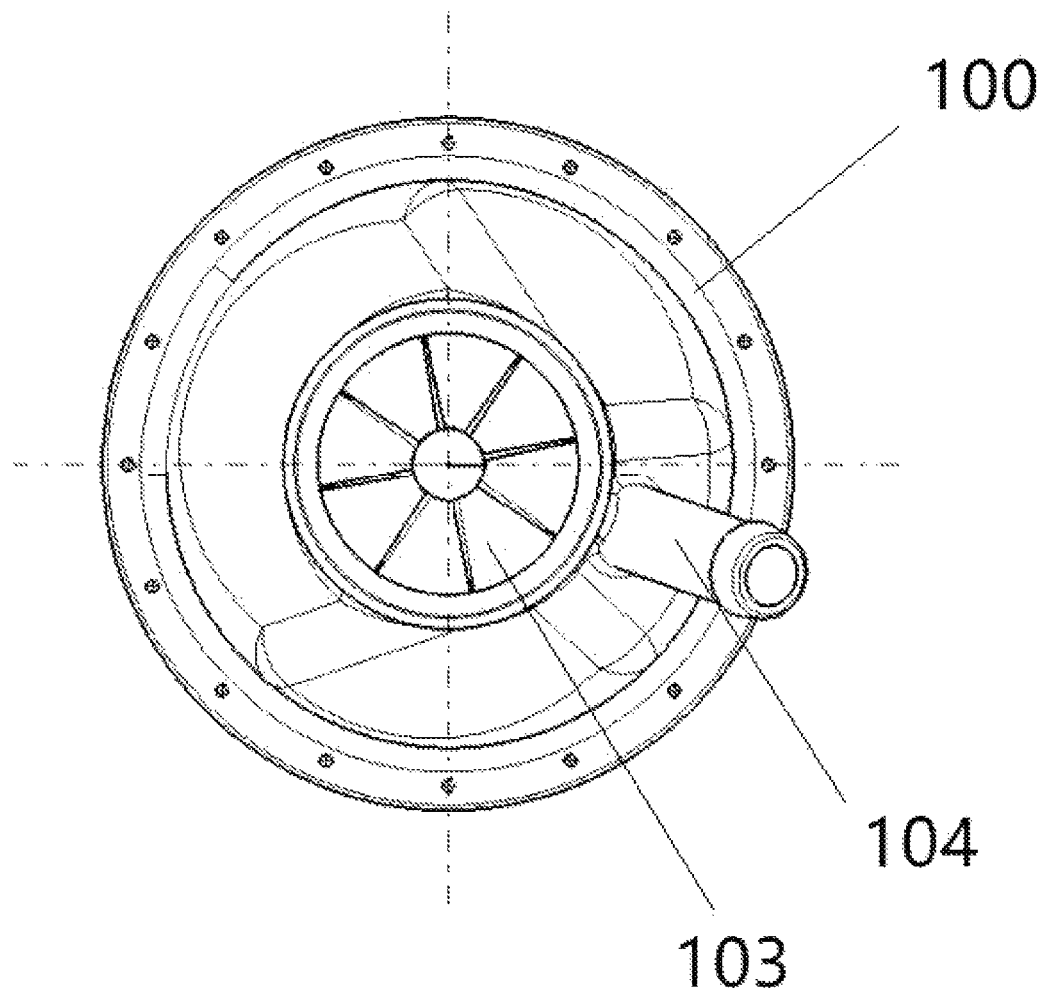
FIG. 5 is a top view of the first housing of FIG. 3.

As shown in FIGS. 3-5, the first housing 100 includes an outer sleeve 101. The outer sleeve 101 is in a shape of a bell mouth with a small upper end and a large lower end. The outer sleeve 101 is provided with a central air inlet pipe 102, to which an end of the outer sleeve 101 is firmly connected (for example, connected by screws or welding). An end of the central air inlet pipe 102 is opposite to an output end of the inner cannula 300.

A lower end of the central air inlet pipe 102 is longer than the outer sleeve 101, and the lower end of the central air inlet pipe 102 is in a shape of a bell mouth. An upper end of the inner cannula 300 is in a shape of a bell mouth, on which the lower end of the central air inlet pipe 102 is disposed. The inner cannula 300 is inserted into the second housing 200 as a part. This structure is conducive to sealing and improving a noise reduction and a drainage effect.

The central air inlet pipe 102 is provided with a water separation structure 103 for pre-separating water vapor from upstream air. The water separation structure 103 is a plurality of blades arranged in rotation. The water vapor coming in the upstream air is rotated by the blades, and the water vapor is removed by centrifugal force. A wall of the central air inlet pipe 102 is provided with a nozzle 104, and the separated water vapor is discharged through the nozzle 104.

During operation, an intake end of the first housing 100 of the broadband muffler is connected to an exhaust pipe of a fuel cell stack, and broadband high-frequency noise generated by the fuel cell stack enters the broadband muffler formed by the inner cannula 300, the first housing 100 and the second housing 200. The broadband muffler attenuates noise energy of a corresponding frequency band. At the same time, gaseous/liquid water produced by a chemical reaction of a reactor is also transferred to the muffler through the pipeline, and part of the water enters a chamber of each muffler structure, and finally flows to a set due to gravity. The water collection tank 201 is stored. In a running state, when air flows through the pipeline, two ends of an inlet and an outlet of the venturi tube 400 at an end of the inner cannula 300 and a middle position form a pressure difference. This pressure difference will pass the water out of the water collection tank 201 through the drainage tube 401 into the inner cannula 300 and discharged out of the central air inlet pipe 102 along a direction of the air flow, that is, the water generated by the fuel cell stack is discharged along a tail pipe while silencing the sound.

Case 2

Figure 10:
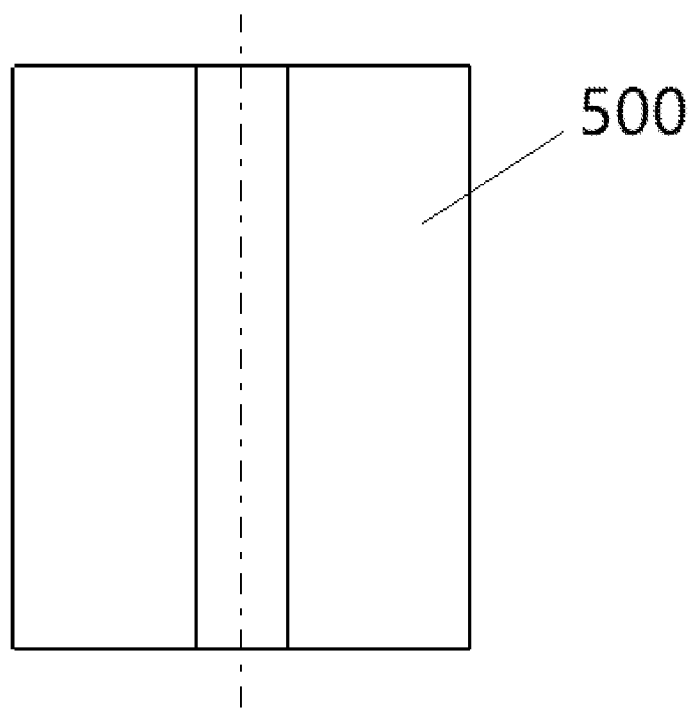
FIGS. 10, 11 and 12 are respectively a front view, a cross-sectional view and a top view of a sound absorbing foam of the broadband muffler of FIG. 1.
Figure 11:
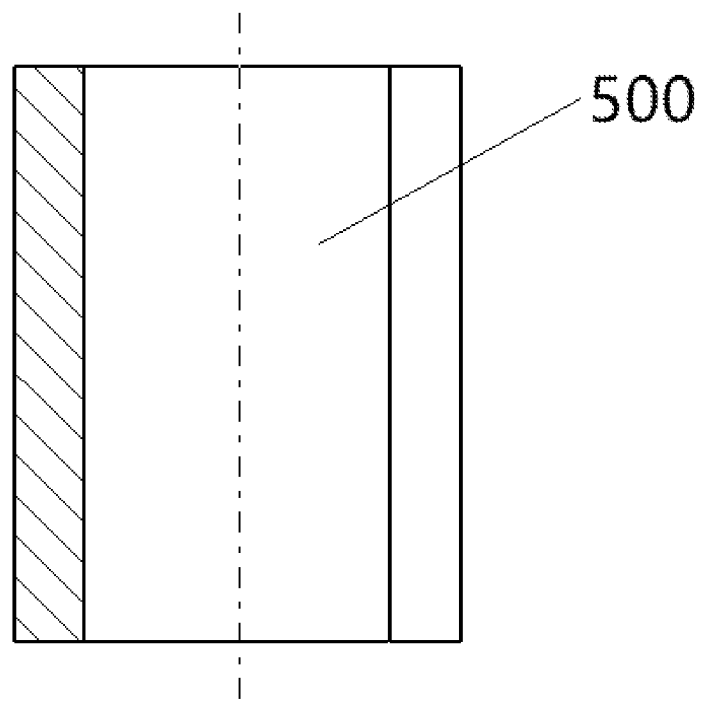
Figure 12:
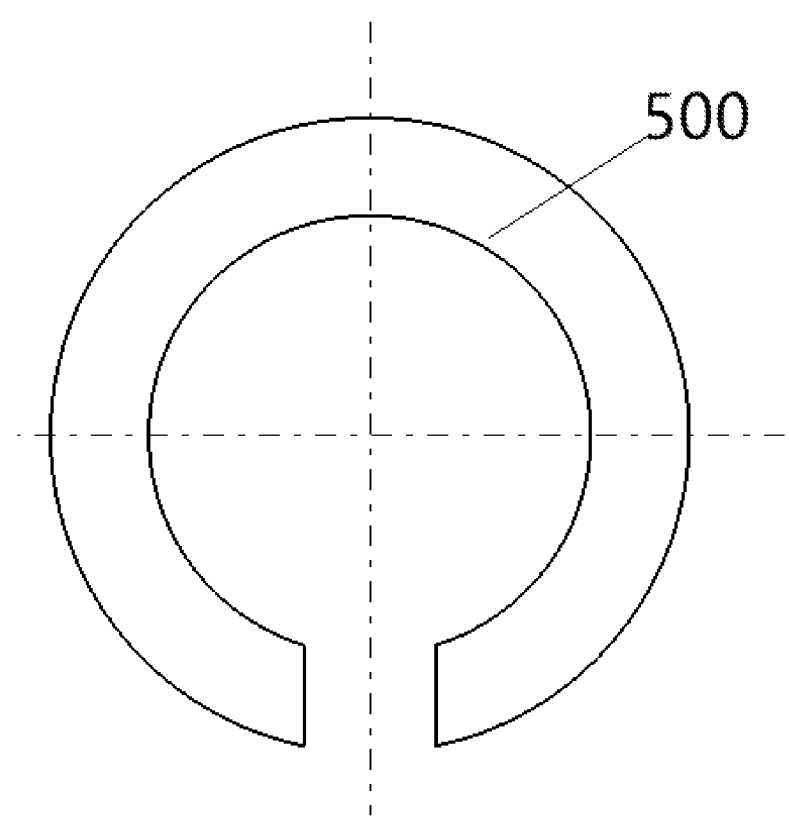

In a specific muffler design, a first kind of the sound-absorbing cotton 500 (a porous sound-absorbing material pressed from a fiber imported from Europe, called OX-Pan in Europe) or a second kind of the sound-absorbing cotton 500 (a type provided by BASF China) may be integrated in the broadband muffler. A structure of these kinds of the foamed sound-absorbing cotton 500 (BASF's internal name is Basotec G+) are shown in FIGS. 10-12.

Figure 15:
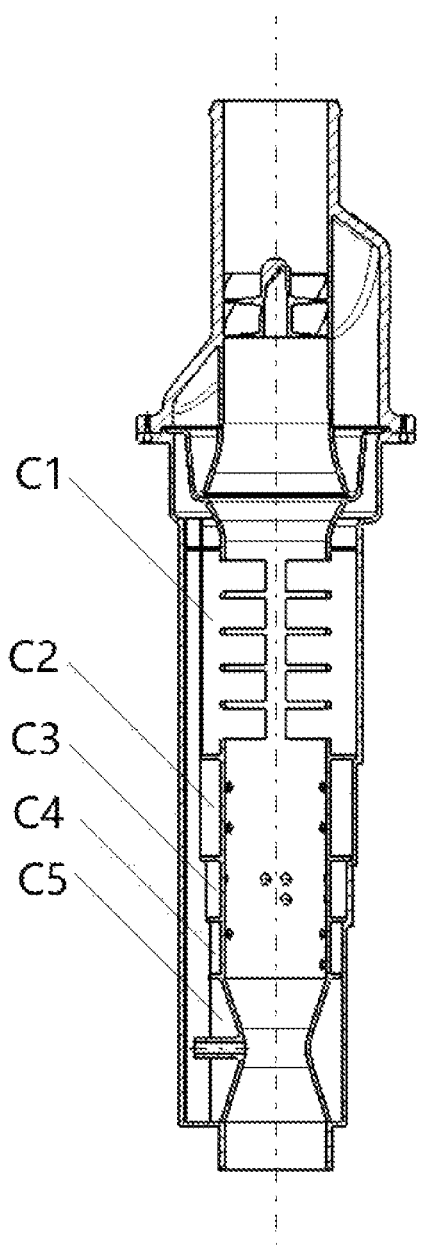
FIG. 15 is another cross-sectional view of the broadband muffler of FIG. 1.

Specific process parameters of the broadband muffler are shown in FIG. 15. In detail, a volume of C1 is 0.27 L, a square or rectangular groove or opening is opened, and an opening rate is 0.66. It is used to fill the sound-absorbing cotton 500. A function range of the sound-absorbing cotton 500 is 1000-8000 Hz. A volume of C2 is 0.1 L, 6 round holes each with a diameter of 5 mm are opened, the opening rate is 0.014, and a corresponding silencing frequency is 1000 Hz. A volume of C3 is 0.044 L, and 11 round holes each with a diameter of 5 mm are opened. The opening rate is 0.045, and the corresponding silencing frequency is 1120 Hz. A volume of C4 is 0.027 L, an opening diameter of each of 5 round holes is 5 mm, the opening rate is 0.022, the corresponding silencing frequency is 1420 Hz, A volume of C5 is 0.13 L, and a cavity is not perforated and is used to install the venturi tube 400 and the drainage tube 401.

Figure 13:
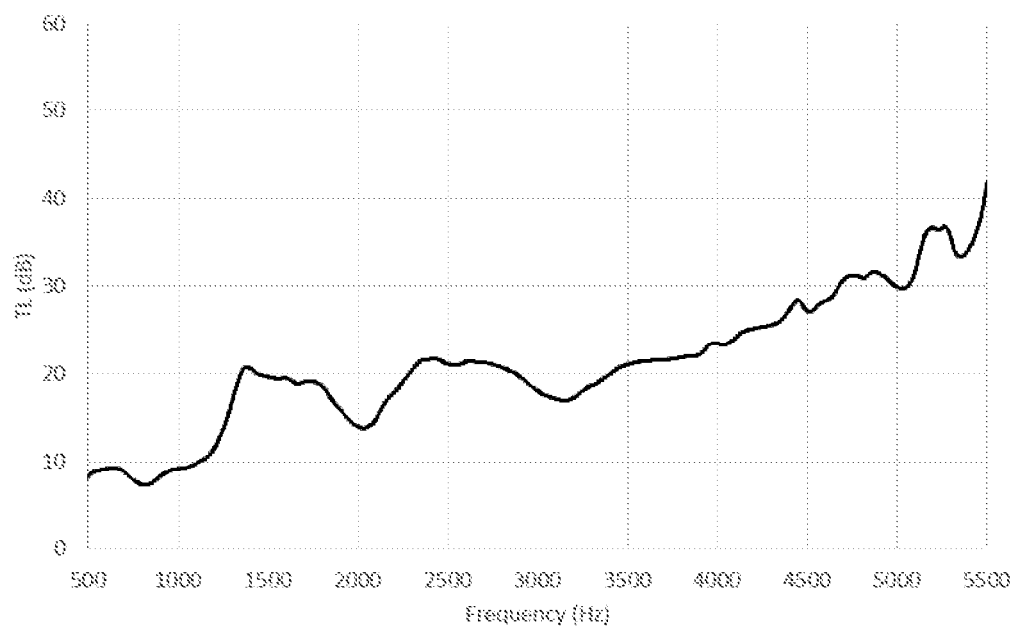
FIG. 13 is a transmission loss (TL) curve (integrated foam 1) of the broadband muffler of FIG. 1.
Figure 14:
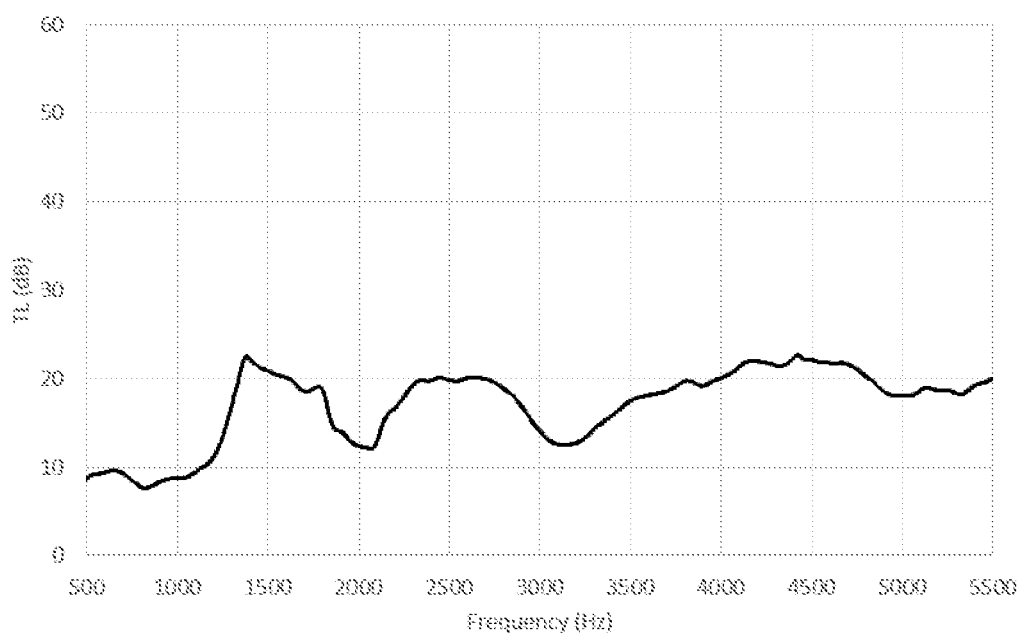
FIG. 14 is another TL curve (integrated foam 2) of the broadband muffler of FIG. 1.

FIG. 13 shows a transmission loss (TL) test result of the broadband muffler with the first kind of the sound-absorbing cotton 500. FIG. 14 shows a TL test result of the broadband muffler with the second kind of the sound-absorbing cotton 500. It can be seen from the two test results that for the muffler with the first kind of the sound-absorbing cotton 500 in a frequency range of 1300-5500 Hz (due to a cut-off frequency of a plane wave, the test can only show up to 5500 Hz), transmission loss and noise reduction can almost be above 20 dB. For the muffler with the second kind of the sound-absorbing cotton 500 in the frequency range of 1300-5500 Hz (due to the cut-off frequency of the plane wave, the test can only display to 5500 Hz), the transmission loss and noise reduction are all above 15 dB.

The foregoing description of the embodiments is to facilitate the understanding and use of the embodiments by those of ordinary skill in the art. Those skilled in the art can obviously make various modifications to these embodiments and apply the general principles described here to other embodiments without creative work. Therefore, the embodiments are not limited to the above-mentioned embodiments. The improvements and modifications made by those skilled in the art based on the disclosure of the embodiments without departing from the scope of the embodiments should fall within the protection scope of the embodiments.

The invention claimed is:

1. A broadband muffler for a fuel cell vehicle, the broadband muffler comprising:
   a first housing;
   a second housing connected to the first housing to form a sealed cavity;
   an inner cannula disposed in the seal cavity and dividing the sealed cavity into a plurality of chambers, the inner cannula comprising square or rectangular openings through a surface of the inner cannula in a first one of the chambers, the inner cannula comprising round holes through the surface of the inner cannula in a different one of the chambers, the square or rectangular openings and the round holes being for reducing noise;
   a water collection tank disposed in the second housing;
   a venturi tube connected to an exhaust port of the inner cannula; and
   a drainage tube disposed at a center of the venturi tube and connected to the water collection tank.

2. The broadband muffler of claim 1, wherein the water collection tank is rectangular and extends along an inner side surface of the second housing.

3. The broadband muffler of claim 1, wherein the second housing is a stepped cylindrical tube, and
   the inner cannula comprises a pipe body and annular partitions disposed on a circumferential outer surface of the pipe body, the annular partitions being respectively arranged at steps of the stepped cylindrical tube and forming the chambers between the annular partitions.

4. The broadband muffler of claim 1, wherein the different one of the chambers comprises a plurality of chambers, wherein the inner cannula comprises the round holes through the surface of the inner cannula in 2-5 of the different chambers.

5. The broadband muffler of claim 1, wherein the square or rectangular openings through the surface of the inner cannula in the first one of the chambers are disposed adjacent to an intake end of the inner cannula.

6. The broadband muffler of claim 1, further comprising sound-absorbing cotton disposed on and/or over an outside of each of the square or rectangular openings through the surface of the inner cannula in the first one of the chambers, to form a resistive resonant cavity.

7. The broadband muffler of claim 1, wherein the round holes through the surface of the inner cannula in the different one of the chambers form resistant resonant cavities.

8. The broadband muffler of claim 1, wherein the first housing comprises:
   an outer sleeve in a shape of a bell mouth with a small upper end and a large lower end, and connected to an end of the second housing; and
   a central air inlet pipe opposite to an output end of the inner cannula.

9. The broadband muffler of claim 8, wherein a lower end of the central air inlet pipe is longer than the outer sleeve, the lower end of the central air inlet pipe is in a shape of a bell mouth, and
   an upper end of the inner cannula is in a shape of a bell mouth, on which the lower end of the central air inlet pipe is disposed.

10. The broadband muffler of claim 8, wherein the first housing further comprises a water separation structure for pre-separating water vapor from upstream air, and disposed in the central air inlet pipe.

11. The broadband muffler of claim 10, wherein the water separation structure comprises blades arranged in rotation.

\* \* \* \* \*